United States Patent [19]

Wartski

[11] 4,395,624
[45] Jul. 26, 1983

[54] MOVING VEHICLE MONITORING SYSTEM

[75] Inventor: Heinz Wartski, Brookline, Mass.

[73] Assignee: Fleet Tech, Inc., Watertown, Mass.

[21] Appl. No.: 203,329

[22] Filed: Nov. 3, 1980

[51] Int. Cl.³ .............................................. G01P 3/48
[52] U.S. Cl. ...................................... 377/15; 324/166; 346/33 D; 364/424; 377/16
[58] Field of Search ...................... 364/424, 424.1, 426; 235/92 FQ, 92 DN, 92 LG; 346/33 D; 324/160, 166

[56] References Cited

U.S. PATENT DOCUMENTS

| | | | |
|---|---|---|---|
| 3,388,404 | 6/1968 | Bush | 346/24 |
| 3,748,580 | 7/1973 | Stevens | 235/92 DN |
| 3,792,445 | 2/1974 | Bucks | 235/92 FQ |
| 3,864,731 | 2/1975 | Callahan | 346/33 D |
| 3,878,371 | 4/1975 | Burke | 235/92 R |
| 3,938,092 | 2/1976 | Callahan | 346/33 D |
| 4,003,019 | 1/1977 | Tronel | 340/52 F |
| 4,067,061 | 1/1978 | Juhasz | 364/424 |
| 4,072,850 | 2/1978 | McGlynn | 364/424 |
| 4,083,052 | 4/1978 | Metcalf | 235/92 DN |
| 4,151,403 | 4/1979 | Woolston | 235/92 DN |
| 4,187,510 | 2/1980 | Dold | 346/21 |
| 4,188,618 | 2/1980 | Weisbart | 364/424 |
| 4,258,421 | 3/1981 | Juhasz | 364/424 |
| 4,281,388 | 7/1981 | Friend | 324/166 |

Primary Examiner—Howard Britton

[57] ABSTRACT

A system for and a method of recording information concerning vehicle operation comprising a logic circuit interfacing with a microprocessor whereby accurate velocity information can be recorded to provide a precise record of operation, including acceleration and deceleration information, over a period of time.

17 Claims, 3 Drawing Figures

MOVING VEHICLE MONITORING SYSTEM

FIELD OF THE INVENTION

This invention relates to a system for and a method of recording information thereby creating a detailed record of the operation of a machine, particularly a motor vehicle, over a period of time.

BACKGROUND OF THE INVENTION

It is often desirable to obtain a record of the operation of a machine over a period of time. This is particularly true in the case of trucks and other motor vehicles where the record can be used to determine operating costs, to check operator performance, and to monitor the need for maintenance.

In the prior art, a chart recorder, usually connected to the drive train or transmission of a vehicle, has been used to create a graphical record of vehicle speed and distance traveled. Engine speed has also been recorded with this type of device. The chart recorder, however, has a number of serious drawbacks. Acceleration and deceleration information cannot be obtained from the chart at all, and the analog information which is on the chart can only be visually read thereby precluding any automatic data processing of the information.

Another type of prior art device is a magnetic tape recorder. While digital information on the resulting tape can be processed automatically, the devices which, are very costly, still do not record velocity information with sufficient accuracy to provide acceleration and deceleration information.

SUMMARY OF THE INVENTION

I have discovered a microprocessor-based digital system for recording machine information (e.g., motor vehicle velocity and distance information) including acceleration and deceleration data, which system compresses and stores quantized pulses generated by a transducer to provide a precise record of machine operation over a period of time.

In a preferred embodiment, a transducer attached to a vehicle's transmission produces a number of pulses per second, which number is proportional to vehicle speed. The number of pulses per second is counted and quantized by a microprocessor into one of sixteen preselected speed ranges or velocity quanta. A number of tests are then performed involving a comparison of the latest range with the immediately preceeding ones, and based on this comparison, a decision is automatically made to record or not record the latest range. For example, the recording is made unless the comparison shows a repetitive condition. Further, depending on the relationship of the range with the previous ones, the data may be compressed with the previously recorded data. The results are stored in a memory and can later be called up and printed out. Accordingly, because of the non-recording of repetitive information and the compression, a long, continuous recording may be stored in a relatively small memory with sufficient accuracy to preserve changes of speed data for acceleration and deceleration information. Furthermore, the compression technique does not result in approximations, and therefore the speed information can be accurately reproduced.

DESCRIPTION OF THE PREFERRED EMBODIMENT

Drawings

We now turn to a description of the preferred embodiment after first briefly describing the drawings.

Figure 1:
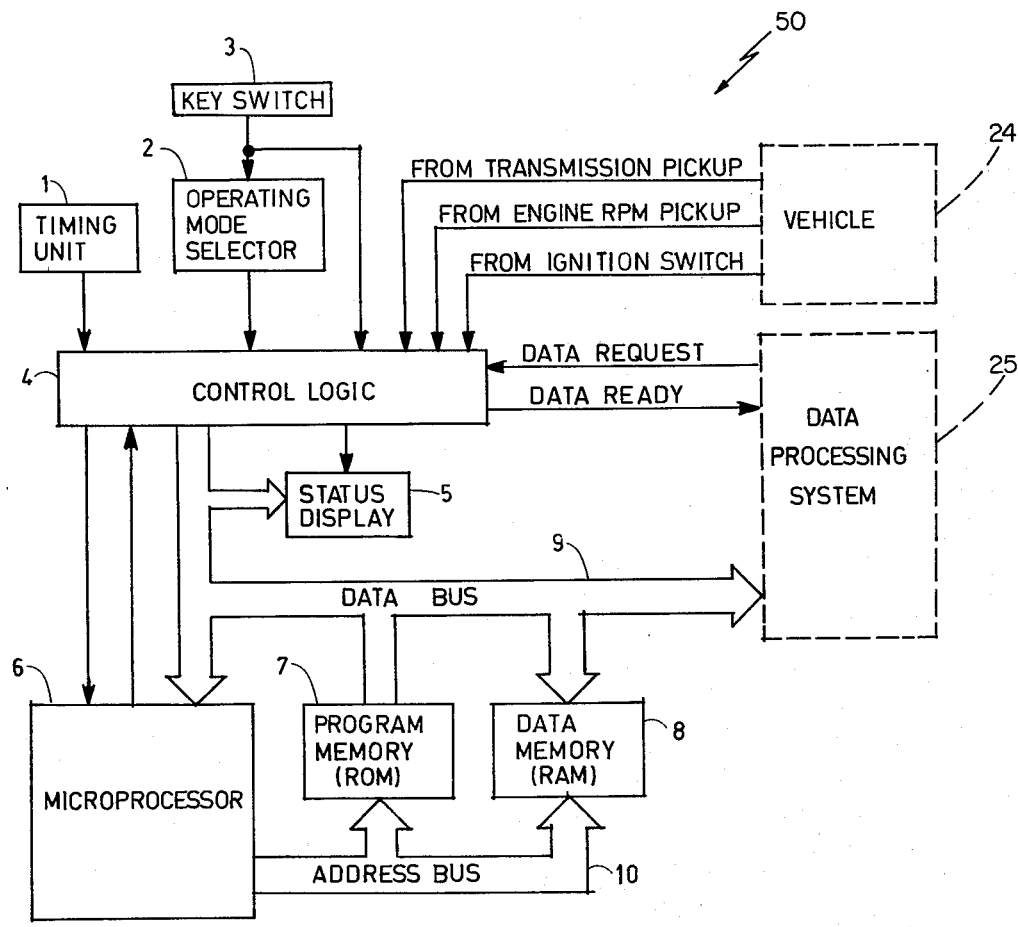
FIG. 1 is a block diagram of the system of this invention.
Figure 3:
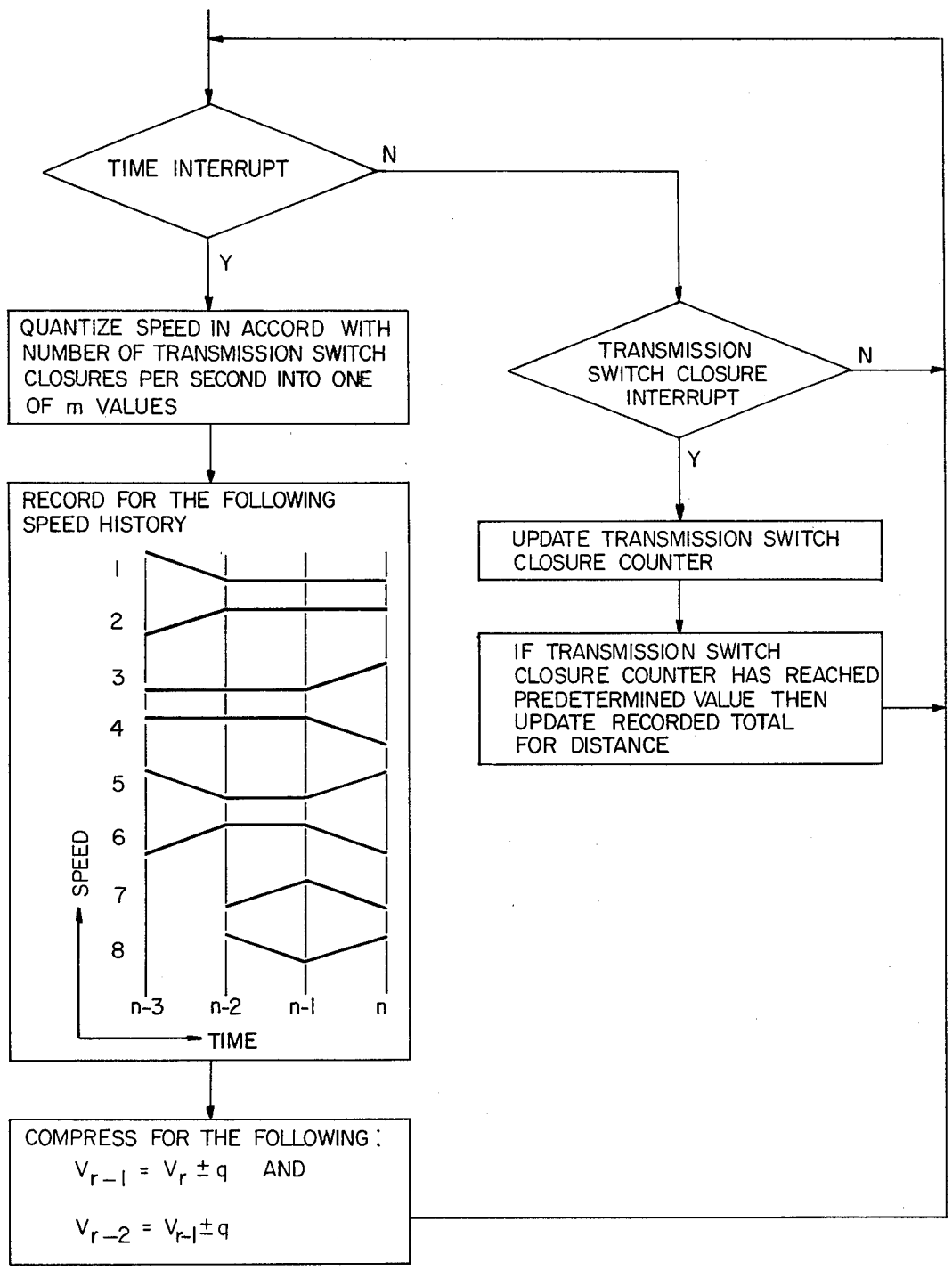

FIG. 3 in a flow chart of a program for use with the system of FIG. 1.

Structure

Referring to FIG. 1, a system for recording is shown at 50. A transducer (not shown), which may be a Yellow Jacket transducer from MassTech of Worcester, Mass., is connected to the transmission of a vehicle in a manner well known in the art so that pulses are generated as the drive shaft turns. An alternate connection may be made to the speedometer cable.

Figure 2:
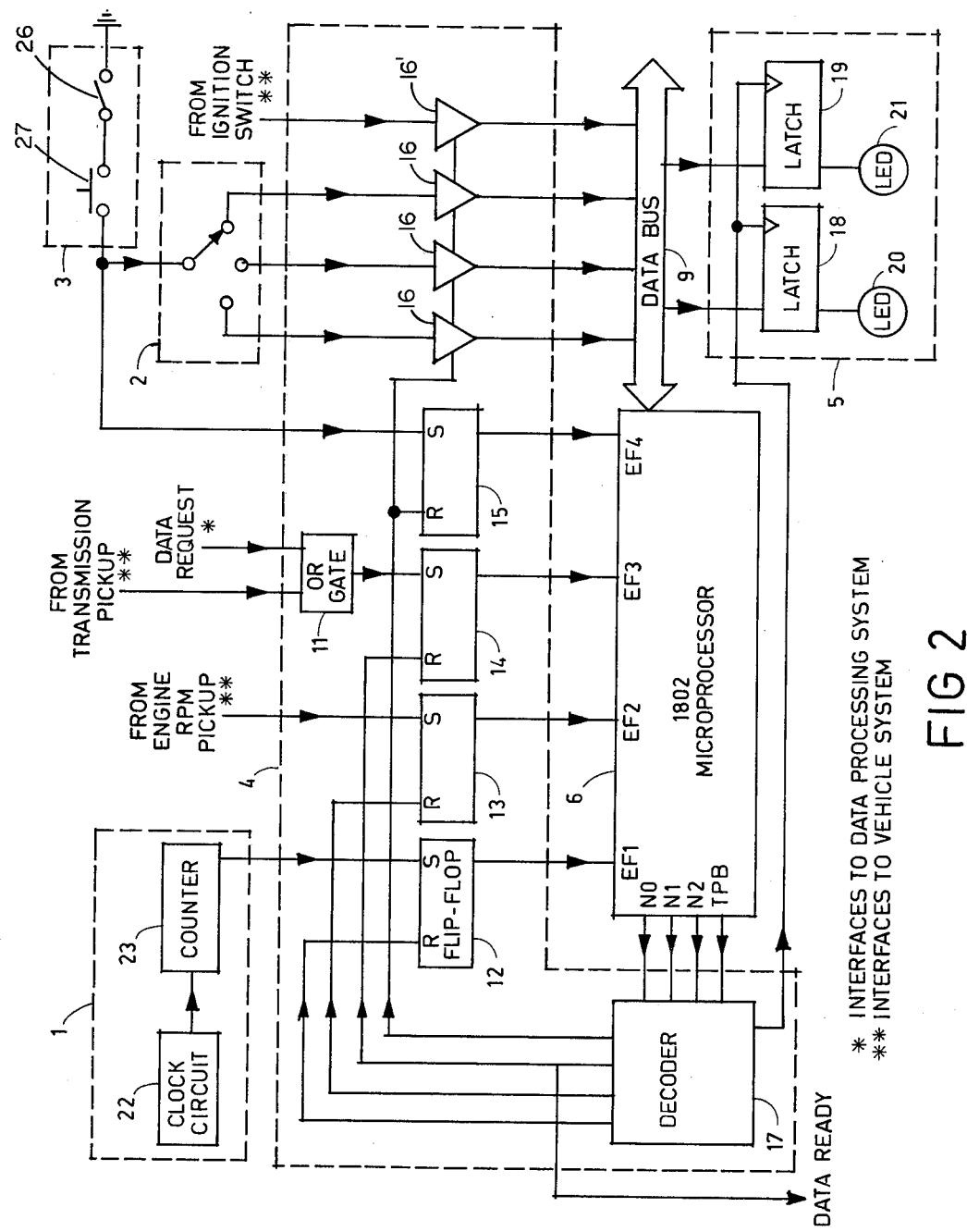
FIG. 2 is a circuit diagram of a portion of the system of FIG. 1.

The pulses from the transducer are fed to a control logic unit 4. Specifically, as shown in FIG. 2, the input line from the transducer is one input of OR gate 11. The other input for OR gate 11 is from a data processing system 25, shown dotted in FIG. 1. The output from OR gate 11 is fed to the set input for flip-flop 14, and the output of flip-flop 14 is fed to the EF3 input of a microprocessor 6. Microprocessor 6 is an RCA/Hughes 1802 microprocessor. The reset input for flip-flop 14 is connected to decoder 17, and the reset signal is a function of N0, N1, N2 and timing signal TPB from microprocessor 6. This reset signal from the decoder 17, which is a Motorola 4028, is also fed to the data processing system 25 through the data ready line.

A similar arrangement exists for an engine RPM line, which carries pulses associated with the rpm of the engine of the vehicle. A transducer connected to a tachometer cable is used to generate these pulses. The line carrying the RPM pulses is fed into a set input of a flip-flop 13 of the control logic 4. The output of flip-flop 13 is sent to the EF2 input of microprocessor 6, and the flip-flop 13 is reset by a signal from the decoder 17, which is a function of N0, N1, N2 and timing signal TPB from microprocessor 6.

A timing unit 1 comprising a clock circuit 22 and a counter 23 feeds its output clock signal to the set input of a third flip-flop 12 of the control logic 4. The output of the flip-flop 12 is connected to the EF1 input of microprocessor 6, and the flip-flop 12 is reset by a signal from the decoder 17, which is also a function of N0, N1, N2 and timing signal TPB.

A key switch 3, which is comprised of a two pole switch 26 with one pole connected to ground in series with a button switch 27, is connected to the set input of a fourth flip-flop 15. The output of the flip-flop 15 is connected to the EF4 input of the microprocessor 6. The reset of flip-flop 15 is activated through the decoder 17 in the same manner as resets of the other flip-flops 12, 13 and 14. The flip-flops are all Motorola 4013.

The output of the key switch 3 is also connected to an operating mode selector 2, which, as shown in FIG. 2, is a three-pole switch. The outputs from each of the three poles are connected to three buffers 16 which also receive the reset signal for flip-flop 15. The outputs of the buffers 16 are connected to a bi-directional data bus 9. Another buffer 16' which receives an input from the ignition switch of the vehicle 24 also has its output connected to the data bus 9. The buffers are all Motorola 4503.

The data bus 9 is connected in a bi-directional manner between the data processing system 25, the microprocessor 6 and a random access memory 8. A read-only-memory 7 may input information onto the bus 9. The read-only-memory 7 and the random access memory 8 are also connected to the microprocessor 6 by an address bus 10.

A status display 5 is also connected to the data bus 9. The status display 5 comprises a pair of latches 18, 19, each of which receives an input from the bus 9 and sends an output to a corresponding light-emitting diode 20, 21. The latches 18, 19 are also connected to the decoder 17. The latches are Motorola 4013.

All the logic is CMOS logic to lessen the effects of noise and other outside interference on the operation of the circuit. All the inputs not shown in the drawings are tied to ground or to the +5 V power source (not shown) to eliminate noise.

Operation

When the two-pole switch 26 of key switch 3 is closed, its pushbutton 27 can be activated thereby setting flip-flop 15. The microprocessor 6 senses that the flip-flop 15 has been set, and it generates a signal via decoder 17 to reset flip-flop 5. At the same time, this output signal gates the buffers 16 and 16' and the information from the operating mode selector 2 and from the ignition switch of the vehicle 24 is sent to the data bus 9. Depending on the position of the switch of the operating mode selector 2 when the buffers 16 are gated, the system performs one of three functions:

1. It clears the data memory 8,
2. It acquires data in data memory 8, or
3. It outputs data from data memory 8.

The system status is shown by the LEDS 20, 21 of the status display 5.

For a new recording, the connections are made to the vehicle as shown in FIG. 1. The data processing system is not connected for this recording mode of operation. The memory is then cleared and the data acquisition function is then selected. The number of pulses in a given time period is directly proportional to the speed of the rotation of the drive shaft and the speed of the vehicle. As the vehicle begins to move, pulses from the transducer attached to the vehicle transmission are sent through OR gate 11 to set flip-flop 14. Each time the microprocessor 6 detects that flip-flop 14 has been set, it generates an output command via decoder 17 to reset the flip-flop 14.

Similarly, pulses from the RPM pickup set flip-flop 13, which is then reset by a command signal from the microprocessor 6 via decoder 17. Also, the timing unit 1 produces pulses at one second intervals which set flip-flop 12, and flip-flop 12 is reset by a command signal from the microprocessor via decoder 17. The interval of the pulses of the timing unit 1 determines the time interval between recorded speeds, as will hereinafter be explained in more detail. For slower vehicles or machines, a longer interval of 1.5 seconds may be used. For faster vehicles subject to rapid speed changes, an interval of 0.5 seconds may be desirable.

Program memory 7 contains the program which controls the operation of the system. A flow chart of the program is shown in FIG. 3.

Initially, the microprocessor 6 counts the number of pulses from the transducer in the vehicle 24. A similar count may be simultaneously made for the RPM pulses. The time interupt function depends on the time interval between pulses of the timing unit 1, e.g., one second in the preferred embodiment. If at a particular point in time ($t_1$) the value of the interval (one second) has not been reached from the start time ($t_0$), the N (no) path is followed to sense for a transmission (transducer) switch closing which would generate a pulse. If there is no closure and thus no pulse, the sensing repeats at the next time ($t_2$). If a closure is detected, the counter is updated by a value of one, and the updating continues in this manner until the timing unit interval (one second) has been reached. Thus, a number of pulses, which number is proportional to vehicle speed, is obtained for the timing interval. This number is then quantizied into one of m pre-selected velocity values. Preferably sixteen such values are used. The sixteen categories are pre-selected depending upon the likely operating conditions of the vehicle. For example, for a truck which will be primarily traveling on a highway, the range of speeds from 45 to 65 mph would probably be most important. Therefore, the quantized ranges or velocity quantums are selected so that the lower speeds (0-45 mph) and higher speeds (65-85 mph) are covered by ranges of ±2.7 mph (a total swing of 5.4 mph). The range of speeds of more interest are covered by groups of ±1.8 mph (a 3.6 mph total), and the range of most interest by groups of ±0.9 mph (a 1.8 mph range). The latter would be used around 55 mph.

As shown on the flow chart of FIG. 3, once a category or velocity quantum has been chosen based on the number of pulses counted, a recording is made of that quantum only if certain conditions are met. This is to avoid the need for blindly recording at each interval (one second in the preferred embodiment) if there is a steady state condition, i.e., constant speed, constant acceleration or constant deceleration. For example, as shown on the record chart of FIG. 3, a recording is made at a time n under eight conditions which fall into three specific categories. A recording is made at time n if there has been a unidirectional change in speed followed by two seconds of constant speed, as shown by examples 1 and 2. A recording is also made if there is two seconds of constant speed followed by a change of speed, as in examples 3 and 4. Finally, speed reversals within the last two or three seconds, as shown in examples 5-8, result in a recording at time n. An additional recording condition (not shown) can be added. There, to give a periodic reference, a recording can be made after a predetermined number of time intervals at a constant speed. Otherwise, a continuous (3 seconds or longer) steady speed would not result in another recording until one of the identified change occurs.

The next step is to determine whether the recorded information can be compressed, and this depends upon the relationship of the successive recorded data. The compression criteria is indicated by the equations:

$$V_{r-1} = V_r \pm q \text{ and } V_{r-2} = V_{r-1} \pm q$$

$V_r$ represents the last recorded speed, and q represents the velocity quantums or speed ranges adjacent to (immediately above and below) that of the quantum for the last recorded speed $V_r$. If the next to last recorded speed $V_{r-1}$ is in either the quantums above or below that of the last recorded speed $V_r$ and the same relationship exists for the next to last recorded speed $V_{r-1}$ and its immediate predecessor $V_{r-2}$, then $V_r$ and $V_{r-1}$ are compressed into a single recording, thereby saving half the memory space which would otherwise be required to record both. To allow the reproduction of the exact relationship of the compressed speeds, a separate register stores configuration information, i.e., whether $V_{r-1}$ is from the velocity quantum above or below that of $V_r$. The sequence is then repeated for the next time interval. Of course, it should be understood that the quantizing, recording decisions and compression occur much more rapidly than the switch closures even at the highest speed.

RPM information is obtained and stored in the same manner.

Thus, with these recording and compression techniques, a continuous recording of several days can be made with a modest size memory.

When the recorded data is desired, the operating mode selector 2 is changed to the output data mode, and the information is sent via the data bus 9 to the data processing system 25 for analysis and/or printout.

What is claimed is:

1. A system for recording data concerning machine operation, comprising:
   a sensing means for generating machine pulses the number of which per a pre-selected timing period is related to the machine parameter or parameters to be measured,
   selecting means for choosing a number of quanta, each selected quantum corresponding to a different pre-selected operational level or range of the machine, and at least some of which quanta corresponding to more than one number of machine pulses per said timing period,
   means for counting the machine pulses for said preselected timing period and selecting the actual quantum into which the number of counted pulses falls,
   means for comparing the actual quantum with some previous quantum or quanta, and
   means for recording the actual quantum if the comparison of the actual quantum with the previous quantum or quanta indicates a non-uniform change in the machine parameter.

2. The system of claim 1 wherein said means for counting comprises a first flip-flop and a microprocessor, said flip-flop being set by each pulse from said sensing means thereby sending its output to said microprocessor which resets said flip-flop by a control signal.

3. The system of claim 2 wherein the control signal is generated by a decoder connected to said microprocessor.

4. The system of claim 2 wherein said means for counting includes a second flip-flop, said second flip-flop being set by pulses from a timing unit, the interval of the timing pulses being constant, said second flip-flop sending an output to said microprocessor and being reset by said microprocessor whereby the interval of the timing pulses is the pre-selected timing period for counting the machine pulses.

5. The system of claim 4 wherein said timing unit comprises a clock, said clock feeding a counter which produces the timing pulses.

6. The system of claim 4 wherein said means for counting includes a third flip-flop which is set by RPM pulses from a second sensing means, the output of said third flip-flop being received by said microprocessor and reset by a control signal from said microprocessor whereby the RPM pulses are counted for the pre-selected timing period.

7. The system of claim 1 wherein said means for recording only records a given quantum if the comparison by said means for comparing indicates the non-uniform change in the machine parameter has occurred within the last three timing periods.

8. The system of claim 1 wherein said means for recording additionally records a quantum at a selected interval greater than three timing periods even if the machine parameter is uniform or even if there is a uniform parameter change over the selected interval.

9. The system of claim 1 wherein said means for recording compresses two sequential quanta into a single recorded quantum if the two sequential quanta are related.

10. The system of claim 9 wherein the compression occurs if the first of the two quantums is adjacent to the second quantum, and the next quantum is adjacent to the first quantum.

11. The system of claim 1 wherein said means for recording includes a random access memory.

12. The system of claim 1 wherein speed is the machine parameter to be recorded and the quanta are velocity quanta.

13. A method of recording information concerning machine operation comprising:
   generating a series of pulses, the number of which per pre-selected timing period is related to the machine parameter or parameters to be measured,
   selecting a number of quanta, each selected quantum corresponding to a different pre-selected operational level or range of the machine and at least some of which quanta corresponding to more than one number of machine pulses per said timing period,
   counting the series of pulses received in said preselected timing period,
   selecting the actual quantum into which the number of counted pulses falls,
   comparing the actual quantum with some previous quantum or quanta, and
   recording the actual quantum if the comparison of the actual quantum with the previous quanta or quantum indicates a non-uniform change in the machine parameter.

14. The method of claim 13 wherein recording includes recording the quantum only if the comparing shows that there has been a non-uniform change in the machine parameter within the last three timing periods.

15. The method of claim 14 wherein recording also includes recording a quantum at a selected interval greater than three timing periods if the machine parameter is uniform or if there is a uniform parameter change over the selected interval.

16. The method of claim 13 further comprising comparing two sequential quanta to determine if they are sufficiently related, and if so, compressing them into a single quantum for recording.

17. The method of claim 16 wherein the compressing occurs if the first of the two quantums is adjacent to the second, and the next earlier quantum is adjacent to the first quantum.

* * * * *